United States Patent [19]

Wefer

[11] Patent Number: 4,780,506

[45] Date of Patent: Oct. 25, 1988

[54] IMPACT RESISTANT POLYETHYLENE TEREPHTHALATE/POLYCARBONATE BLENDS

[75] Inventor: John M. Wefer, Newtown, Conn.

[73] Assignee: Uniroyal Chemical Company, Inc., Middlebury, Conn.

[21] Appl. No.: 39,564

[22] Filed: Apr. 16, 1987

[51] Int. Cl.[4] ............................................. C08L 69/00
[52] U.S. Cl. ................................................... 525/67
[58] Field of Search .................... 525/67, 148, 146, 69

[56] References Cited

U.S. PATENT DOCUMENTS 4,493,921  1/1985  Wefer ..................................... 525/67
4,515,918  5/1985  Nouvertne et al. .................. 524/504

Primary Examiner—Theodore E. Pertilla
Attorney, Agent, or Firm—John A. Shedden

[57] ABSTRACT

High impact strength blends based on polyethylene terephthalate resin, aromatic polycarbonate resin and styrene-acrylonitrile grafted copolymers of EPDM.

6 Claims, No Drawings

IMPACT RESISTANT POLYETHYLENE TEREPHTHALATE/POLYCARBONATE BLENDS

This invention relates to an improved high impact composition comprising a blend of polyethylene terephthalate resin, polycarbonate resin and a grafted EPDM copolymer composition.

BACKGROUND OF THE INVENTION

Products designed around thermoplastic polyester resins are in great demand because of the tremendous versatility of these resins and their inherent properties.

The term thermoplastic polyester refers to high molecular weight polyester and copolyesters of glycols and dibasic acids such as terephthalic or isophthalic acid. These are described for example in U.S. Pat. Nos. 2,465,319 and 3,047,539. Because of its rapid crystallization rate, polybutylene terephthalate (PBT) has been preferred for injection molded articles while polyethylene terephthalate (PET), with its very slow crystallization rate, has largely been used in packaging. Nucleating agents have been used to increase the crystallization rate, and post molding heat treatment (annealing) can be used to crystallize molded articles made of PET. The crystallized PET tends to higher tensile strength, stiffness, and heat resistance compared to uncrystallized PET. Nucleating agents and/or annealing are generally not required to crystallize molded PBT articles.

In order to improve the overall property spectrum of PET, the resin has often been blended with numerous other resins. Specific additives are also incorporated to increase the general level of the impact strength of the PET containing blends as well as the consistency of the impact property in a molded article.

Illustrative of the specific additives or impact modifiers that have been proposed to be used with thermoplastic polyester resins are the family of modifiers comprising polyalkyl acrylates, methacrylates, and/or ethacrylates (Brinkmann et al; U.S. Pat. No. 3,591,659) typical of which is Acryloid KM-330, a polyacrylate resin sold by Rohm & Haas Co.

Certain rubber resin graft copolymers have also been proposed to effect impact resistance of polyester resins. In U.S. Pat. No. 3,919,353 (Castelnuovo et al) EPDM grafted with common ethylenically unsaturated monomers is disclosed to be an effective impact modifier. Polybutadiene is taught to be the preferred elastomer. All of the examples use polybutadiene grafted with styrene-methyl methacrylates and the elastomer is crosslinked.

One of the resin blends preferred for its overall balance of molded properties is that comprising polyesters and polycarbonate (PC) resins. It should be noted that the impact strength at room temperature of most polycarbonates is relatively high. For example, the Notched Izod Impact at Room Temperature (NIRT)(ft-lb/in.) of numerous commercial polycarbonates such as LEXAN 103 (trademark of General Electric) is often in the range of from about 16 to 20 ft-lb/in. However, to obtain maximum chemical resistance of polyester/polycarbonate blends, it is desirable to keep the polycarbonate content low. Furthermore, polycarbonate resin is susceptible to mechanical stress cracking which can be exacerbated by exposure to unfavorable environments such as the presence of solvents or solvent vapors. This tendency to stress crack provides an additional reason to utilize as little polycarbonate resin as possible in these polyester blends.

When adding impact modifiers to polyethylene terephthalate/polycarbonate blends, susceptibility to the effects of ester interchange on the final blend properties must also be taken into account. Blends under high shear conditions that contain certain impact modifiers, especially low molecular weight esters, tend to break the modifiers down which, in turn, react with the polymers realizing blends that have unpredictable properties. The ester interchange reaction can be minimized, of course, by the use of inhibitors and/or by lowering the shear level.

Various blends based on polyester resin, polycarbonate resin and graft copolymer rubber-resin materials have heretofore been proposed (e.g., U.S. Pat. Nos. 3,591,659; 3,919,353; 4,022,748; 4,034,013; 4,034,016; 4,044,073; 4,096,202; 4,260,690 and 4,280,949).

U.S. Pat. No. 4,257,937 teaches the impact modification of polyester/polycarbonate blends via a polyacrylate resin such as Acryoid KM-330 and 7709-XP (trademarks of Rohm & Haas Co.)

U.S. Pat. No. 4,172,859 (Epstein) discloses blends of polyesters, polycarbonate and an impact modifier which can comprise various monomers, combinations of which can include EPDM.

U.S. Pat. No. 4,493,921 represents another step in the continuing effort to improve the level of performance of polyester-type resin/polycarbonate-type blends via the addition to polybutylene terephthalate (PBT)/PC blends of an impact modifier comprising an ethylene-propylene-non-conjugated diene (EPDM) rubber spine grafted with either a styrene/acrylonitrile monomer mixture, a styrene/methyl methacrylate monomer mixture or a methyl methacrylate monomer mixture.

One of the art recognized difficulties realized in the impact-modification polyester art is the unpredictability of the modifier effect, i.e., a modifier that enhances the properties of one polyester such as polybutylene terephthalate (PBT) or a PBT resin blend, may have little property modification in a different polyester or polyester blend. For example, certain polyacrylate modifiers such as Acryloid KM-330, while capable of significantly improving the impact properties of a PBT/PC resin blend, will have much less effect on a PET/PC blend.

SUMMARY OF THE INVENTION

A graft copolymer rubber resin material has been found that significantly enhances on a broad spectrum the physical properties of polyethylene terephthalate/polycarbonate resin blends.

In accordance with this invention rubbery spine polymer of a certain EPDM having grafted thereon styrene-acrylonitrile monomeric material based on comparisons with similarly structured materials, has been found to unexpectedly increase the impact properties of PET/PC blends.

DETAILED DESCRIPTION OF THE INVENTION

The present invention is based on a blend of (a) polyethylene terephthalate resin, (b) polycarbonate resin and (c) graft copolymer composition comprising EPDM-type rubber grafted with styrene-acrylonitrile monomers. These blends have high impact properties even at low polycarbonate levels.

Preparations of polyethylene terephthalates are well known in the art and a basic description is described, for example, in U.S. Pat. Nos. 2,465,319 and 2,471,023.

Polycarbonate resins can be made by known processes and they are available commercially from many sources, e.g., General Electric Co., Pittsfield, Mass., U.S.A. under the trademark LEXAN. In general, any of the aromatic polycarbonates described in U.S. Pat. No. 4,034,016; 4,257,937 and/or 4,280,949 can be used, especially those including units derived from bisphenol-A.

The graft copolymer material (c) constituting the third component of the invention is based on a graft copolymer of resin-forming monomeric material on a rubbery unsaturated spine polymer of ethylene-propylene-non-conjugated diene (EPDM). The preferred non-conjugated diene is ethylidene norbornene.

The grafted monomeric resin comprises the monomers styrene (which also includes substituted styrenes) and acrylonitrile. The styrene:acrylonitrile monomer ratios are in the range of from 90:10 to 40:60; preferably from 90:10 to 50:50; and most preferably from 80:20 to 60:40.

It will be understood that in practice the product of the graft copolymerization process is actually a mixture of true graft of resin on rubber along with a certain amount of separate, ungrafted resin (that is, the grafting efficiency is not 100 percent: see U.S. Pat. No. 4,202,948, Peascoe incorporated herein by reference.)

The graft copolymer of the present invention is an ethylene-propylene-non-conjugated diene terpolymer upon which is grafted a "graft resin".

The method by which the graft copolymer is formed, that is, the method by which the styrene-acrylonitrile graft resin is grafted onto the ethylene-propylene-non-conjugated diene terpolymer is set forth in detail in U.S. Pat. Nos. 3,489,821; 3,489,822; and 3,642,950. All three of these patents are incorporated herein by reference. It is emphasized that although these patents teach grafting of not only styrene-acrylonitrile but other monomers as well, it is submitted that the method utilized therein applies to the formation of the graft copolymers of the present invention.

The graft copolymers of the present invention include a graft resin constituency, that is a styrene-acrylonitrile concentration, comprising between about 5 percent and 75 percent by weight, based on a total weight of the graft copolymer. More preferably, the graft resin comprises between about 30 percent and 70 percent by weight, based on the total weight of the graft copolymer. Most preferably, the graft resin comprises between about 40 percent and 60 percent by weight, based on the total weight of the graft copolymer.

The terpolymer of the present invention to which the graft resin is attached is characterized by a weight ratio of ethylene to propylene in the range of between about 50:50 and 75:25. Further, the ethylene-propylene-non-conjugated diene terpolymer, the so-called "rubber" portion of the graft copolymer, possesses an intrinsic viscosity, as measured in tetralin at 135° C., in the range of between about 1.5 and 2.6. The Mooney Viscosity (ML-4 at 257° F.) of the rubber portion is in the range of between about 30 to 100. Typically, the ungrafted rubber is defined by an Iodine number in the range of between about 4 and 30.

Generally, the proportion of the three polymeric ingredients may vary, as indicated in the following table, wherein the amounts are expressed in parts by weight per 100 parts of blend:

|  | Parts by Weight | | |
| --- | --- | --- | --- |
|  | Broad | Preferred | More Preferred |
| (a) Polyester resin | 20–90 | 20–80 | 40–60 |
| (b) Polycarbonate resin | 20–60 | 20–50 | 20–40 |
| (c) Graft copolymer | 20–50 | 20–40 | 20–30 |

The total amount of the polycarbonate resin and the graft copolymer should be greater than 40% by weight of the PET/PC/graft copolymer blend.

Preferred compositions tend to include a major proportion of the polyester resin component (a) which combines good moldability and good properties at elevated temperature, along with sufficient polycarbonate resin (b) and graft copolymer (c) to provide high notched impact strength.

Although it is possible to use modifier (c) levels above about 30%, such an increase would tend to decrease hardness, tensile strength and stiffness.

There is no specific upper limit for the level of polycarbonate (b). Blends containing 40% (or more) of (b) are capable of providing satisfactory results.

To prepare the blends of the invention, the PET resin component (a), the polycarbonate resin component (b), and the graft copolymer composition (c) are mixed together at elevated temperature in conventional plastics mixing equipment, such as a twin screw extruder-mixer. If desired, any two of the components may be mixed together first, followed by mixing in of the third component.

One desirable mixing procedure is a two-step compounding process involving first working the graft copolymer compositions (c) without the other ingredients (a) and (b), under shearing and fluxing conditions, for example in a twin screw extruder-mixer. This disperses the EPDM within the resin contained in the graft copolymer composition to form an "inverted" composition in which the EPDM rubber is a discontinuous phase. The second step involves fluxing the inverted graft component (c) with the PET component (a) and the polycarbonate component (b) under lower shear conditions, for example in a single screw extruder. In commercial practice these two steps can be combined in one extrusion operation, using an extruder having a first and second feedport; a section of the extruder downstream of the first feedport can be used to shear (invert) the graft copolymer (c) and a section downstream of the second feedport can be used to mix the graft with the other ingredients (a) and (b).

The inverted graft composition (a) may also be pelletized and tumble blended with PET (a) and polycarbonate (b) pellets to form a physical mixture which can be fed into an injection molding machine or an extruder. In this case the plasticizing screw of the injection or extrusion machine can perform the second stage of the mixing during fabrication.

As indicated, the invention is based on the discovery that three-component blends of polyethylene terephthalate (PET) with polycarbonate (PC) and ethylene-propylene-ethylidene norbornene (EPDM) grafted with styrene-acrylonitrile resin have unexpectedly high impact strength as well as a broad spectrum of other highly desirable physical and chemical properties.

The following examples will serve to illustrate and delineate the practice of the inventions in more detail.

COMPARATIVE EXAMPLES 1-6

The following examples illustrate the impact results realized via the use of the polyacrylate impact modifier Acryloid KM-330 (a trademark of Rohm and Haas) in polyethylene terephthalate/polycarbonate and polybutylene terephthalate/polycarbonate blends.

The blends listed in Table 1 are prepared by fluxing the Acryloid KM-330 with PET (KODAPAK 7352; trademark EASTMAN CHEMICALS) or PBT (VALOX 310; trademark of General Electric Co.); and polycarbonate resin (reaction product of bis-phenol A with phosgene (LEXAN 141; a trademark of General Electric Co.) in a 1" single-screw extruder equipped with strand die and pelletizer. Specimens for mechanical property testing are cut from ⅛ inch injection molded plaques.

In Table 1 (and the remaining Tables) the amounts of each component are express in parts by weight; PET stands for the polyethylene terephthalate; PBT stands for the polybutylene terephthalate; PC stands for the polycarbonate resin; NIRT stands for Notched Izod Impact Strength at room temperature (reported in foot pounds per inch of notch). NIRT (annealed) means Notched Izod Impact Strength at room temperature determined after annealing the specimen for 2 hours at 150° C. in a circulating air oven. The annealing process causes the PET to crystallize and will tend to increase tensile and stiffness of the blend. The PBT blends are crystallized as molded.

TABLE 1

| Comparative Examples | 1 | 2 | 3 | 4 | 5 | 6 |
|---|---|---|---|---|---|---|
| Acryloid KM-330 | 10 | 20 | 30 | 10 | 20 | 30 |
| PET | | | | 70 | 60 | 50 |
| PBT | 70 | 60 | 50 | | | |
| PC | 20 | 20 | 20 | 20 | 20 | 20 |
| NIRT (As molded) | 3.1 | 21.2 | 17.8 | 1.5 | 14.9 | 11.7 |
| NIRT (annealed) | — | — | — | 1.0 | 2.0 | 2.2 |

The above comparative examples show that although a given polyacrylate additive may perform satisfactorily as an impact modifier for certain polyester/polycarbonate blends, specifically PBT/PC blends, one cannot predict that the additive will affect the impact properties of another polyester, albeit a homologous one, in a similar manner.

COMPARATIVE EXAMPLES 7-14

Three graft copolymers, designated A, B and C in TABLE II below, are prepared by the slurry technique described in U.S. Pat. No. 4,202,948 (Peascoe) using an ethylene-propylene-ethylidene norbornene EPDM terpolymer rubber (E/P ratio 60/40; Mooney viscosity 68 ML-4 @ 257° F.; iodine number 20) as the spine rubber. The resin forming monomers in each graft are indicated in TABLE II, which gives the composition of the resin portion of the graft copolymers. The overall resin/EPDM ratio in the graft copolymer is 50/50 in each case.

TABLE II

| Resin | Ratio |
|---|---|
| A Styrene/Acrylonitrile | 72/28 |
| B Styrene/Methyl Methacrylate | 50/50 |
| C Methyl Methacrylate | 100 |

The blends listed in TABLE III are prepared by first fluxing the graft copolymers (A, B or C) in a 53 mm Werner and Pfliederer twin-screw extruder equipped with a strand die and pelletizer. The pelletized grafts are then fluxed with PBT (VALOX 310; trademark of General Electric Co.) and polycarbonate resin (reaction product of bisphenol A with phosgene; LEXAN 103 (trademark of General Electric)) in a one-inch single-screw extruder to make the blend shown in TABLE III. Specimens for mechanical property testing are cut from ⅛ inch injection molded plaques. (See our U.S. Pat. No. 4,493,921).

TABLE III

| Comparative Examples | 7 | 8 | 9 | 10 | 11 | 12 | 13 | 14 |
|---|---|---|---|---|---|---|---|---|
| B | 20 | | | 10 | 30 | | 20 | |
| C | | 20 | | | | | | |
| A | | | 20 | | | 30 | | 20 |
| PBT | 60 | 60 | 60 | 70 | 50 | 50 | 40 | 40 |
| PC | 20 | 20 | 20 | 20 | 20 | 20 | 40 | 40 |
| NIRT | 17.8 | 15.0 | 17.9 | 2.6 | 19.2 | 19.0 | 16.4 | 16.2 |

The above comparative examples show that in PBT/PC blends, incorporation of graft copolymers comprising ethylene-propylene-non-conjugated diene rubbery spin having grafted thereon either styrene-acrylonitrile resin methyl methacrylate resin or styrene-methylmethacrylate resin, results in similar, i.e., equivalent enhancement of impact strength properties provided at least 20% of the modifier is present.

EXAMPLES 1-10

Three graft copolymers, designated D, E and F are prepared by the slurry technique described in U.S. Pat. No. 4,202,948 (Peascoe). Graft copolymers D and F used an ethylene-propylene-ethylidene-norbornene EPDM terpolymer rubber (E/P ratio 60/40; Mooney viscosity 68 ML-4 at 257° F., iodine number 20) as the spine rubber. Graft copolymer E used an ethylene-propylene-dicyclopentadiene EPDM terpolymer rubber (E/P ratio 52/48; Mooney viscosity 60 ML-4 at 257° F., iodine number 7) as the spine rubber. The resin forming monomer in the grafts of D and E is methyl methacrylate and the resin of graft copolymer F is a styrene-acrylonitrile resin with a ratio of 72/28. The weight ratio of EPDM to resin is 50:50.

The blends listed in TABLE IV are prepared by first fluxing the graft copolymers (D, E or F) in a 53 mm Werner and Pfleiderer twin-screw extruder equipped with a strand die and pelletizer. The pelletized grafts are then fluxed with PET (KODAPAK 7352; a trademark of Eastman Chemicals) and polycarbonate resin (reaction product of bis-phenol A with phosgene (LEXAN 141; a trademark of General Electric Co. ) in a one-inch single-screw extruder to make the blends. Specimens for mechanical property testing are cut from ⅛ inch injection molded plaques.

TABLE IV

| EXAMPLE | 1 | 2 | 3 | 4 | 5 | 6 | 7 | 8 | 9 | 10 |
|---|---|---|---|---|---|---|---|---|---|---|
| D | 20 | | | | 20 | | | 20 | | |

TABLE IV-continued

| EXAMPLE | 1 | 2 | 3 | 4 | 5 | 6 | 7 | 8 | 9 | 10 |
|---|---|---|---|---|---|---|---|---|---|---|
| E |  | 20 |  |  |  | 20 |  |  | 20 |  |
| F |  |  | 20 | 30 |  |  | 20 |  |  | 20 |
| PET | 60 | 60 | 60 | 50 | 50 | 50 | 50 | 40 | 40 | 40 |
| PC | 20 | 20 | 20 | 20 | 30 | 30 | 30 | 40 | 40 | 40 |
| NIRT (as molded) | 3.0 | 1.9 | 10.2 | 18.7 | 18.4 | 15.6 | 19.3 | 19.5 | 16.0 | 19.1 |
| NIRT (annealed) | 0.8 | 0.7 | 0.8 | 15.2 | 4.6 | 5.3 | 4.8 | 15.8 | 12.1 | 17.7 |

TABLE IV illustrates the overall superiority of Notched Izod Impact for graft F, containing styrene-acrylonitrile as the grafted resin (Examples 3, 4, 7 and 10).

Additionally, comparison of the results realized in Example 3 versus Example 4 illustrates the greatly enhanced properties achieved when the weight percent of the polycarbonate and the graft copolymer exceeds 40% of the three component blend.

EXAMPLES 11–20

Two additional graft copolymers, designated G and H were prepared similarly to graft copolymers D and F except that the resin forming monomer in G was methyl methacrylate with an EPDM/resin ratio of 47/53 and the resin forming comonomers in H was styrene-methyl methacrylate (50/50) with an EPDM/resin ratio of 47/53.

The blends of TABLE V were prepared as those in Examples 1–10 and specimens were similarly prepared.

TABLE V

| EXAMPLE | 11 | 12 | 13 | 14 | 15 | 16 | 17 | 18 | 19 | 20 |
|---|---|---|---|---|---|---|---|---|---|---|
| G | 30 |  |  |  |  | 20 |  |  |  |  |
| H |  | 30 |  |  |  |  | 20 |  |  |  |
| D |  |  | 30 |  |  |  |  | 20 |  |  |
| E |  |  |  | 30 |  |  |  |  | 20 |  |
| F |  |  |  |  | 30 |  |  |  |  | 20 |
| PET | 50 | 50 | 50 | 50 | 50 | 40 | 40 | 40 | 40 | 40 |
| PC | 20 | 20 | 20 | 20 | 20 | 40 | 40 | 40 | 40 | 40 |
| NIRT (annealed) | 8.6 | 6.8 | 14.3 | 11.9 | 15.2 | 12.7 | 16.2 | 15.8 | 12.1 | 17.7 |

The above TABLE V underscores the superior results realized via the blends of this invention (Examples 15 and 20).

Note in particular the surprisingly poor results obtained in comparative example #12 which is completely unexpected based on the good performance of a styrene-methylmethacrylate graft in an otherwise similar PBT/PC blend TABLE III, Comparative Example #7).

The foregoing examples may be repeated using other aromatic polycarbonate resins; polyethylene terephthalate resins; or ethylene-propylene-non-conjugated diene terpolymers grafted as set forth above.

What is claimed is:
1. A blend comprising
  (a) polyethylene terephthalate resin;
  (b) polycarbonate resin; and
  (c) graft copolymer of styrene-acrylonitrile resin on an ethylene-propylene-non-conjugated diene rubber spine, said styrene-acrylonitrile resin being present in an amount of about 5–75% by weight of the graft copolymer; and
wherein the proportions of (a), (b) and (c) expressed in parts by weight per 100 parts of (a), (b) and (c) are as follows:
  (a) 20–90
  (b) 20–60
  (c) 20–50; and the combined parts by weight of (b) and (c) is greater than 40.

2. A blend comprising
  (a) polyethylene terephthalate resin;
  (b) polycarbonate resin; and
  (c) graft copolymer of styrene-acrylonitrile resin on an ethylene-propylene-ethylidene norbornene rubber spine, said styrene-acrylonitrile resin being present in an amount of about 5–75% by weight of the graft copolymer; and
wherein the proportions of (a), (b) and (c) expressed in parts by weight per 100 parts of (a), (b) and (c) are as follows:
  (a) 20–90
  (b) 20–60
  (c) 20–50; and the combined parts by weight of (b) and (c) is greater than 40.

3. A blend comprising
  (a) polyethylene terephthalate resin;
  (b) polycarbonate resin; and
  (c) graft copolymer of styrene-acrylonitrile resin on an ethylene-propylene-ethylidene norbornene rubber spine, said styrene-acrylonitrile resin being present in an amount of about 5–75% by weight of the graft copolymer, said graft copolymer being an inverted composition in which the rubber is a discontinuous phase; and
wherein the proportions of (a), (b) and (c) expressed in parts by weight per 100 parts of (a), (b) and (c) are as follows:
  (a) 20–90
  (b) 20–60
  (c) 20–50; and the combined parts by weight of (b) and (c) is greater than 40.

4. A blend comprising
  (a) polyethylene terephthalate resin;
  (b) polycarbonate resin; and
  (c) graft copolymer of styrene-acrylonitrile resin on an ethylene-propylene-ethylidene norbornene rubber spine, said styrene-acrylonitrile resin being present in an amount of about 30–70% by weight of the graft copolymer, the graft copolymer having been worked under shearing and fluxing conditions to disperse the rubber portion of the graft within the resinous portion thereof thus forming an inverted composition in which the rubber portion is a discontinuous phase prior to blending with (a) and (b); and wherein the proportions of (a), (b) and (c) expressed in parts by weight per 100 parts of (a), (b) and (c) are as follows:
(a) 20–90
(b) 20–60
(c) 20–50.

5. The blend of claim 1 wherein the proportions of (a), (b) and (c) are as follows:
(a) 20–80
(b) 20–50
(c) 20–40.

6. The blend of claim 1 wherein the proportions of (a), (b) and (c) are as follows:
(a) 40–60
(b) 20–40
(c) 20–30.

* * * * *